[12] United States Patent  
Pateux et al.

(10) Patent No.: US 8,204,111 B2  
(45) Date of Patent: Jun. 19, 2012

(54) METHOD OF AND DEVICE FOR CODING A VIDEO IMAGE SEQUENCE IN COEFFICIENTS OF SUB-BANDS OF DIFFERENT SPATIAL RESOLUTIONS

(75) Inventors: Stephane Pateux, Saint-Gregoire (FR); Sylvain Kervadec, Rennes (FR); Isabelle Amonou, Thorigne Fouillard (FR)

(73) Assignee: France Telecom, Paris (FR)

( * ) Notice: Subject to any disclaimer, the term of this patent is extended or adjusted under 35 U.S.C. 154(b) by 1519 days.

(21) Appl. No.: 11/571,950

(22) PCT Filed: Jun. 28, 2005

(86) PCT No.: PCT/FR2005/001640  
§ 371 (c)(1),  
(2), (4) Date: Feb. 2, 2007

(87) PCT Pub. No.: WO2006/016029  
PCT Pub. Date: Feb. 16, 2006

(65) Prior Publication Data  
US 2008/0291996 A1    Nov. 27, 2008

(30) Foreign Application Priority Data  
Jul. 13, 2004    (FR) ...................... 04 07836

(51) Int. Cl.  
*H04N 7/12* (2006.01)  
*H04N 11/02* (2006.01)  
*H04N 11/04* (2006.01)  
(52) U.S. Cl. .......... 375/240.11; 375/240.16; 375/240.19  
(58) Field of Classification Search .................... 375/240  
See application file for complete search history.

(56) References Cited

U.S. PATENT DOCUMENTS

2004/0114689 A1* 6/2004 Zhang et al. ............. 375/240.16  
2004/0264567 A1* 12/2004 Xu et al. .................. 375/240.11

FOREIGN PATENT DOCUMENTS

WO    03/107683    12/2003

OTHER PUBLICATIONS

International Search Report dated Dec. 1, 2005 for corresponding International Application No. PCT/FR2005/001640, filed Jun. 28, 2005.  
Tham J. Y. et al., "Highly Scalable Wavelet-Based Video Codec for Very Low Bit-Rate Environment," IEEE Journal on Selected Areas in Communications, IEEE Inc., vol. 16, No. 1, pp. 12-27, XP000734808, 1998.  
Pearlman W. A. et al., "Embedded Video Subband Coding with 3D SPIHT," Wavelet Image and Video Compression, pp. 397-432, 1998.  
Taubman, D, " High Performance Scalable Image Compression with Ebcot," IEEE Transactions on Image Processing, IEEE Inc., vol. 9, No. 7, pp. 1158-1170, XP000951990, Jul. 2000.

\* cited by examiner

*Primary Examiner* — Joseph Ustaris  
*Assistant Examiner* — Xiaolan Xu  
(74) *Attorney, Agent, or Firm* — David D. Brush; Westman, Champlin & Kelly, P.A.

(57) ABSTRACT

A video image sequence including coefficients of frequency sub-bands with different spatial resolutions is coded. A data stream including at least one restitution level (Niv N−2, Niv N−1, Niv N) is formed. The restitution levels have coefficients of frequency sub-bands whose spatial resolution equals a spatial resolution of the restitution level. There are inserted, in at least one restitution level, coefficients of frequency sub-bands with a spatial resolution higher than the spatial resolution or resolutions of the restitution level.

18 Claims, 6 Drawing Sheets

METHOD OF AND DEVICE FOR CODING A VIDEO IMAGE SEQUENCE IN COEFFICIENTS OF SUB-BANDS OF DIFFERENT SPATIAL RESOLUTIONS

RELATED APPLICATIONS

The present application is based on, and claims priority from, France Application Number 04 07836, filed Jul. 13, 2004 and International Application Number PCT/FR2005/00164, filed Jun. 28, 2005, the disclosures of which are hereby incorporated by reference herein in their entirety.

FIELD OF THE INVENTION

The present invention concerns a method and device for coding a video image sequence in coefficients of frequency sub-bands of different spatial resolutions.

The invention also concerns the associated decoding method and device.

BACKGROUND OF THE INVENTION

More precisely the present invention is situated in the field of the coding of a sequence of digital images using motion compensation and temporal transforms by discrete wavelet transformation.

Certain algorithms in the field of the coding of a sequence of digital images propose solutions for associating points between two images.

These algorithms use motion compensated temporal filtering by discrete wavelet decomposition. These algorithms execute first of all a wavelet temporal transform between the images in the video image sequence and then spatially decompose the resulting temporal sub-bands. More precisely, the video image sequence is decomposed into two groups of images, the even images and the odd images, and a motion field is estimated between each even image and the closest odd image or images used during the wavelet temporal transformation. The even and odd images are compensated for motion with respect to each other iteratively in order to obtain temporal sub-bands. The iteration of this group creation and motion compensation process can be effected in order to generate different wavelet decomposition levels. The temporal images are subsequently filtered spatially by means of wavelet analysis filters.

At the end of the decomposition the result is a set of spatio-temporal sub-bands. The motion field and the spatio-temporal sub-bands are finally coded and transmitted in retrieval levels corresponding to the resolution levels targeted.

According to these algorithms the quantisation and entropic coding steps are performed following the decomposition. The coefficients of the high-frequency sub-bands, temporal or spatial, that are not directly used for the resolution of the requested retrieval level are eliminated.

When the motion between the different images of the video image sequence is a motion of the translation or rotation type, the high-frequency coefficients belonging to a higher resolution than that of the retrieval level can be omitted without artefacts appearing when the video image sequence is reconstructed.

When the motion between the various images in the video image sequence is a motion of the expansive or contractive type, the inventors of the present invention have noticed that eliminating the high-frequency coefficients belonging to a higher resolution than that of the restitution level creates artefacts when the image sequence is reconstructed.

An aim of the invention is to resolve the drawbacks of the prior art by proposing a method and device for coding and decoding a video image sequence that improve the video image sequence reconstruction, when contractive or expansive motions exist between the images in the video image sequence.

SUMMARY OF THE INVENTION

According to a first aspect, the invention proposes a method of coding a video image sequence in coefficients of frequency sub-bands of different spatial resolutions, the coding method forming at least one data stream consisting of at least one restitution level comprising coefficients of frequency sub-bands whose spatial resolution is equal to a spatial resolution of the restitution level, characterised in that the method comprises the step of inserting, in at least one restitution level, coefficients of frequency sub-bands with a spatial resolution higher than the spatial resolutions of the restitution level.

Correspondingly, the invention concerns a device for coding a video image sequence in coefficients of frequency sub-bands of different spatial resolutions, the coding device forming at least one data stream consisting of at least one restitution level comprising coefficients of frequency sub-bands whose spatial resolution is equal to a spatial resolution of the restitution level, characterised in that the device comprises means of inserting, in at least one restitution level, coefficients of frequency sub-bands with a spatial resolution higher than the spatial resolution or resolutions of the restitution level.

Thus the reconstruction of a video image sequence is improved, even when contractive or expansive motions exist between the images in the video image sequence.

According to another aspect of the invention, prior to the insertion, in a restitution level, of coefficients of frequency sub-bands with a resolution higher than the spatial resolutions of the restitution level, an effective spatial resolution is obtained for each frequency sub-band coefficient, each effective spatial resolution is compared with the spatial resolution or resolutions of the restitution level and the frequency sub-band coefficients inserted in the restitution level of the coefficients whose effective spatial resolution is lower than the spatial resolution or resolutions of the restitution level.

Thus it is possible to determine, from the effective spatial resolution, the coefficients that must be inserted and therefore to reduce the quantity of data transmitted or stored.

According to another aspect of the invention, the effective spatial resolution of a coefficient is obtained by determining a pseudo-resolution for each frequency sub-band coefficient and dividing the spatial resolution of the sub-band to which a coefficient belongs by the pseudo-resolution of the coefficient.

Thus the effective contribution of the coefficient, for the resolution level, is correctly estimated.

According to another aspect of the invention, for each coefficient the pseudo-resolution is determined by estimating a motion field between each image and at least one image adjacent to the image in the video image sequence, by determining, for each block of each image in the video image sequence, at least one expansion factor between the block of the image and the corresponding block in at least one adjacent image, the pseudo-resolution of a block is set to the value one if the expansion factor of the block is equal to one or the pseudo-resolution of a block is set to the maximum value of the following values: the value one, the value of the expansion factor between the block of the image and the corresponding block in at least one adjacent image.

According to another aspect of the invention, the expansion factor of a block is determined by associating the block with a plurality of triangles, determining for each triangle an affine transformation between the vertices of the triangle in the block and the vertices of the corresponding triangle in the adjacent image, determining, for each triangle, the expansion factor of the triangle by calculating the determinate of the affine transformation of the triangle and determining the expansion factor of the block from the expansion factors of the triangles associated with the block.

Thus it is possible to detect expansive or contractive motions simply and to take these into account.

According to another aspect of the invention the coding of the video image sequence in coefficients of sub-bands with different spatial resolutions is carried out by temporal filtering and discrete wavelet decomposition and the data stream is a stream of scalable data consisting of a plurality of restitution levels.

Thus is it possible to transmit the coded video image sequence in a scaled manner.

According to another aspect of the invention, the video image sequence was previously coded in a data set comprising the coefficients of the frequency sub-bands with spatial resolutions and a plurality of data streams are formed consisting of a restitution level and comprising coefficients of frequency sub-bands whose spatial resolution is equal to a spatial resolution of the restitution level and coefficients of frequency sub-bands with a spatial resolution higher than the spatial resolutions of the restitution level.

Thus it is possible to execute a transcoding of a coded video image sequence and to supply to clients a data stream adapted to their requirements.

According to another aspect of the invention, the spatial resolution of each frequency sub-band coefficient inserted in a restitution level is inserted in the data stream.

The invention also concerns a method of decoding a data stream obtained by a temporal filtering and discrete wavelet decomposition, the data stream consisting of at least one restitution level comprising coefficients of frequency sub-bands whose spatial resolution is equal to a spatial resolution of the restitution level, characterised in that the method comprises the steps of:
obtaining, in at least one restitution level, coefficients of spatial sub-bands with a spatial resolution higher than the spatial resolution or resolutions of the restitution level,
synthesis of the coefficients of frequency sub-bands whose spatial resolution is equal to a spatial resolution of the restitution level and coefficients of frequency sub-bands with a spatial resolution higher than the spatial resolution or resolutions of the restitution level.

Correspondingly, the invention concerns a device for decoding a data stream obtained by temporal filtering and discrete wavelet decomposition, the data stream consisting of at least one restitution level comprising coefficients of frequency sub-bands whose spatial resolution is equal to a spatial resolution of the restitution level, characterised in that the device comprises:
means of obtaining, in at least one restitution level, coefficients of spatial sub-bands with a spatial resolution higher than the spatial resolution or resolutions of the restitution level,
means of synthesising the coefficients of frequency sub-bands whose spatial resolution is equal to a spatial resolution of the restitution level and coefficients of frequency sub-bands with a spatial resolution higher than the spatial resolution or resolutions of the restitution level.

According to another aspect of the invention, prior to the synthesis of the coefficients of frequency sub-bands with a resolution higher than the spatial resolution of resolutions of the restitution level, an effective spatial resolution is obtained for each frequency sub-band coefficient, each effective spatial resolution is compared with the spatial resolution or resolutions of the restitution level, and the frequency sub-band coefficients synthesised are the coefficients whose effective spatial resolution is lower than the spatial resolution or resolutions of the restitution level.

Thus the artefacts related to contractive or expansive movements are reduced.

According to another aspect of the invention, the effective spatial resolution of each frequency sub-band coefficient is obtained by reading it in the data stream.

Thus the decoder does not need to calculate the effective spatial resolution.

The invention also concerns a signal comprising a video image sequence coded in coefficients of frequency sub-bands with different spatial resolutions, the signal forming at least one data stream consisting of at least one restitution level comprising coefficients of frequency sub-bands whose spatial resolution is equal to a spatial resolution of the restitution level, characterised in that the signal comprises, in at least one restitution level, coefficients of frequency sub-bands with a spatial resolution higher than the spatial resolution or resolutions of the restitution level.

The invention also concerns a method of storing or a method of transmitting a signal comprising a video image sequence coded in coefficients of frequency sub-bands with different spatial resolutions, the signal forming at least one data stream consisting of at least one restitution level comprising coefficients of frequency sub-bands whose spatial resolution is equal to a spatial resolution of the restitution level, and in which the signal comprises, in at least one restitution level, coefficients of frequency sub-bands with a spatial resolution higher than the spatial resolution or resolutions of the restitution level.

The advantages of the decoding method device being identical to the advantages of the coding method and device, these will not be repeated.

The invention also concerns the computer program stored on an information medium, the said program containing instructions for implementing the methods described above, when they are loaded into and executed by a computer system.

The characteristics of the invention mentioned above, as well as others, will emerge more clearly from a reading of the following description of an example embodiment, the said description being given in relation to the accompanying drawings.

DETAILED DESCRIPTION OF THE DRAWING

Figure 1:
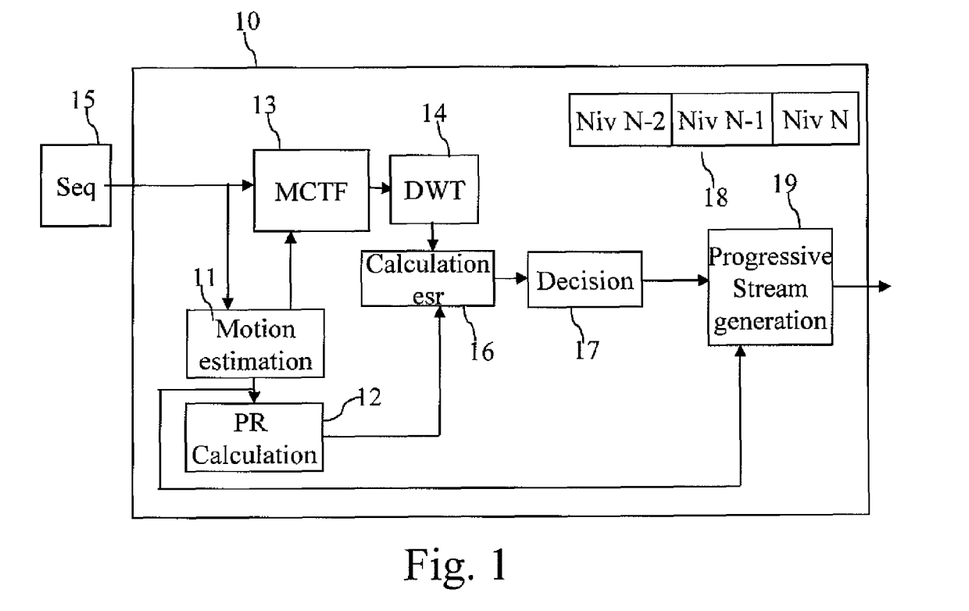
FIG. 1 is a block diagram of a video coder with motion compensated temporal filtering and discrete wavelet decomposition according to a prepared embodiment of the invention.

FIG. 1 is a block diagram of a video coder with motion compensated temporal filtering and discrete wavelet decomposition according to the invention.

The video coder with motion compensated temporal filtering and discrete wavelet decomposition 10 is able to code a video image sequence 15 into a stream of scalable data 18. A stream of scalable data is a stream in which the data are arranged so that it is possible to transmit a representation, in terms of resolution and/or quality of the image, that is variable according to the type of application receiving the data. The data included in this stream of scalable data are coded so as to ensure the transmission of video image sequences in a scalable manner both in terms of quality and resolution, without having to effect different codings of the video image sequence. It is thus possible to store on a data medium and/or to transmit only part of the scalable data stream 18 corresponding to a restitution level to a telecommunication terminal when the transmission rate of the telecommunication network is low and/or when the telecommunication terminal does not need a high quality and/or resolution. It is also possible to store on a data medium and/or to transmit the entire scalable data stream 18 to a telecommunication terminal when the transmission rate of the telecommunication network is high and when the telecommunication terminal requires a high quality and/or resolution, using the same scalable data stream 18.

Figure 4:
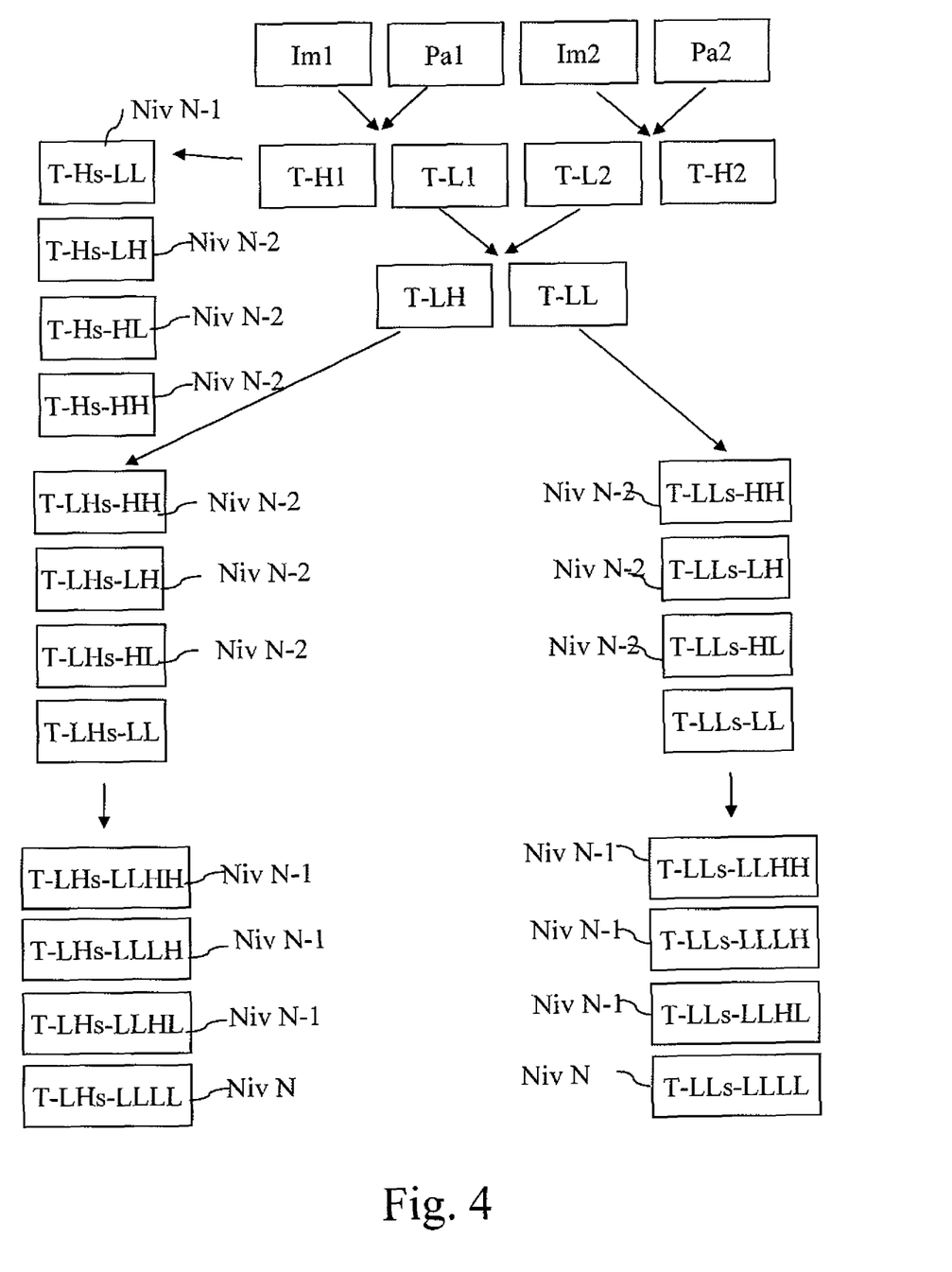
FIG. 4 is a diagram of an example of images obtained by motion compensated temporal filtering and discrete wavelet decomposition according to a preferred embodiment of the invention.

According to the invention the video coder 10 comprises a motion compensated temporal filtering module 13. The motion compensated temporal filtering module 13 transforms a group of (N+1)/2 low-frequency images and a group of N/2 high-frequency images, and transforms these images using a motion estimation made by a motion estimation module 11 of the video coder 10. FIG. 4 depicts a video image sequence consisting of images Im1, Pa1, Im2 and Pa2. This video image sequence is divided into a group of odd images comprising the images Im1 and Im2 and a group of even images comprising the images Pa1 and Pa2.

The motion estimation module 11 executes an estimation of motion between each odd image and the adjacent images in the video image sequence. The motion compensated temporal filtering module 13 compensates the even image for movement so that the temporal filtering is as effective as possible. This is because, the smaller the difference between the prediction of an image and the image, the more it will be able to be compressed effectively, that is to say with a good rate/distortion compromise, or in an equivalent manner a good ratio of compression ratio to reconstruction quality.

It should be noted here that, in a variant when Haar filters are used for the discrete wavelet decomposition, the motion estimation is made in a single direction between the image and an adjacent image.

The motion estimation module 11 calculates, for each image, a motion field between an image and the adjacent images, for example and non-limitingly, by a matching of blocks in an odd image to the even images. This technique is known by the English term "block matching". Naturally other techniques can be used such as for example the technique of motion estimation by meshing. In the particular case of an estimation by blocks the value of the motion of the block can be allocated to each pixel in the block of an image. In a variant, the weighted motion vector of the block and the weighted motion vectors of the adjacent blocks are allocated to each pixel of the block according to the technique known by the name OBMC (Overlapped Block Motion Compensation).

The motion compensated temporal filtering module 13 performs a discrete wavelet decomposition between the images in order to decompose the video image sequence into several temporal sub-bands, distributed over one or more resolution levels. The discrete wavelet decomposition is applied recursively to the low temporal sub-bands of the temporal sub-bands as long as the required decomposition level has not been reached. Thus, according to the example in FIG. 4 and in the case of the use of Haar filters, the images Im1 and Pa1 are decomposed in order to form a low temporal sub-band denoted T-L1 and a high temporal sub-band denoted T-H1. Likewise, the images Im2 and Pa2 are decomposed in order to form a low temporal sub-band denoted T-L2 and a high temporal sub-band denoted T-H2. A second discrete wavelet decomposition is applied to the temporal sub-band T-L1 and T-L2 in order to form a low temporal sub-band denoted T-LL and a high temporal sub-band denoted T-LH.

The various temporal sub-bands obtained by the motion compensated temporal filtering module 13 are transferred to a discrete wavelet decomposition module 14 that performs a spatial decomposition of these temporal sub-bands. Thus, according to the example in FIG. 4, the temporal sub-band T-H1 is decomposed into a low-frequency sub-band T-Hs-LL and three high-frequency sub-bands T-Hs-LH, T-Hs-HL and T-Hs-HH. The temporal sub-band T-LH is decomposed into a low-frequency sub-band T-LHs-LL and three high-frequency sub-bands T-LHs-LH, T-LHs-HL and T-LHs-HH and the frequency sub-band T-LHs-LL is decomposed again into a low-frequency sub-band T-LHs-LLLL and three high-frequency sub-bands T-LHs-LLLH, T-LHs-LLHL and T-LHs-LLHH.

The temporal sub-band T-LL is decomposed into a low-frequency sub-band T-LLs-LL and three high-frequency sub-bands T-LLs-LH, T-LLs-HL TLLs-HH and the frequency sub-band T-LLs-LL is decomposed again into a low-frequency sub-band T-LLs-LLLL and three high-frequency sub-bands T-LLs-LLLH, T-LLs-LLHL T-LLs-LLHH.

The temporal sub-band T-H2 is decomposed into a low-frequency sub-band T-H's-LL and three high-frequency sub-bands T-H's-LH, T-H's-HL T-H's-HH. These sub-bands are not depicted in FIG. 1.

The sub-band T-Hs-LL is decomposed once again into a low-frequency sub-band T-Hs-LLLL and three high-frequency sub-bands T-Hs-LLLH, T-Hs-LLHL and T-Hs-LLHH. These sub-bands are not shown in FIG. 1.

The sub-band T-H's-LL is decomposed once again into a low-frequency sub-band T-H's-LLLL and three high-frequency sub-bands T-H's LLLH, T-H's-LLHL and T-H's-LLHH. These sub-bands are not shown in FIG. 1.

Figure 5A:
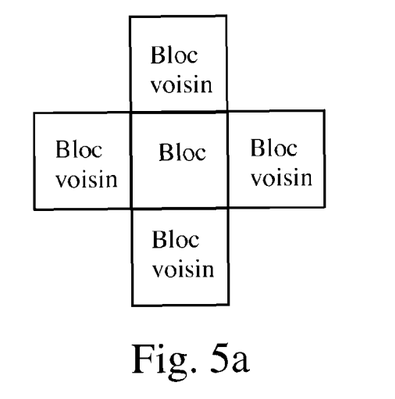
FIGS. 5a and 5b are diagrams of the association of a block of an image with a plurality of triangles.
Figure 5B:
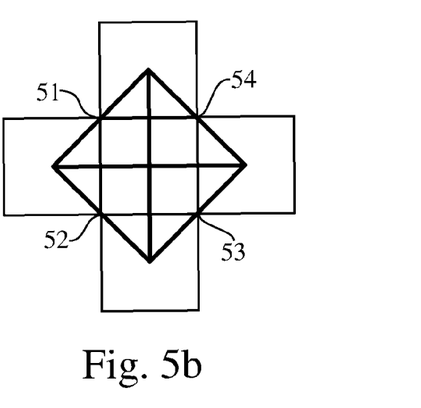

The video coder comprises a pseudo-resolution calculation module 12. The pseudo-resolution calculation module 12 associates each block of an image that has been defined by the motion prediction module 11 with four triangles. From a block depicted in FIG. 5a and its neighbour blocks, the pseudo-resolution calculation module 12 forms four triangles denoted 51, 52, 53 and 54 in FIG. 5b.

From the motion vector determined by the motion field estimation module 11 and associated with the block that was associated with the triangles, the pseudo-resolution calculation module 12 determines an expansion factor for each triangle. The expansion factor $\rho_t$ of a triangle is obtained by representing the motion of the triangle between two adjacent images by an affine transformation applied to a triangle of an image in order to obtain a projection of the triangle in the adjacent image. An affine transformation can represent the motions that are liable to appear between two images, namely translations, rotations and changes in scale.

The affine transformation is depicted here in the form of a 3*3 matrix and makes it possible to obtain the coordinates (x',y') of each vertex of the triangle in the adjacent image from the coordinates (x,y) of the vertex in the image according to the formula:

$$\begin{pmatrix} x' \\ y' \\ 1 \end{pmatrix} = \begin{pmatrix} m00 & m01 & m02 \\ m10 & m11 & m12 \\ 0 & 0 & 1 \end{pmatrix} \begin{pmatrix} x \\ y \\ 1 \end{pmatrix}$$

The expansion factor $\rho_t$ of a triangle is obtained by calculating the determinant of the matrix $$\rho_t = \left( \det \begin{bmatrix} m00 & m01 \\ m10 & m11 \end{bmatrix} \right) \frac{1}{2}$$

The expansion factor $\rho$ of the block is determined by the pseudo-resolution calculation module 12 from the expansion factors of the triangles associated with the block. The expansion factor $\rho$ of the block is for example determined by calculating the mean of the calculation factors $\rho_t$ of the triangles or in a variant by allocating to the expansion factor $\rho$ the maximum value of the expansion factors $\rho_t$ of the triangles. It should also be noted that, in another variant, with each pixel of the block there can be associated an expansion factor determined as a function of the values of the expansions factors $\rho_t$ weighted respectively by the inverse of the distance separating the pixel of each triangle associated with the block.

The pseudo-resolution calculation 12 performs the operations for each block of the image and for each image in the video image sequence 15.

Once the expansion factor $\rho$ has been determined the pseudo-resolution calculation module 12 determines a pseudo-resolution denoted PR from it. If the expansion factor $\rho$ is equal to one, the motion is considered to be a translation or a rotation, and the pseudo-resolution PR is then set to a value 1. If the expansion factor $\rho$ is different from 1, the pseudo-resolution PR is equal to the maximum value of the following values: the number one; the value of the expansion factor between the block of the image currently being processed and the corresponding block in the previous image in the video image sequence 15; the value of the expansion factor between the block of the image currently being processed and the corresponding block in the following image in the video image sequence 15.

It should be noted here that, when for example temporal decomposition filters requiring a larger number of images are used by the motion compensated temporal filtering module 13 when the temporal transformation is performed on several decomposition levels, the pseudo-resolution can also be composed with regard to time taking into account the motion over a greater temporal neighbourhood.

It should also be noted here that, when for example Haar temporal decomposition filters are used by the motion compensated temporal filtering module 13, the pseudo-resolution PR is equal to the maximum value of the following values: the number 1; the value of an expansion factor between the block of the image currently being processed and the corresponding block in the preceding image in the video image 15.

The pseudo-resolution calculation module 12 determines a pseudo-resolution PR for each block of each image in the video image sequence 15.

The video coder with motion compensated temporal filtering and discrete wavelet decomposition also comprises an effective spatial resolution and calculation module 16. The effective spatial resolution calculation module 16 determines, for each coefficient denoted c of each spatial sub-band decomposed by the discrete wavelet decomposition module 14, an effective spatial resolution denoted esr(c). The effective spatial resolution calculation module 16 associates, with each coefficient c, the pseudo-resolution of the block corresponding spatially to the spatial coordinates of the coefficient. This pseudo-resolution is denoted pr(c).

An effective spatial resolution of a coefficient is determined by dividing the spatial resolution sr(c) of the coefficient c by the pseudo-resolution associated with the coefficient c. This effective spatial resolution is denoted esr(c).

Spatial resolution of a coefficient means the spatial resolution of the frequency sub-band to which it belongs.

Thus, according to the example in FIG. 4, the coefficients of the sub-bands T-Hs-LH, T-Hs-HL, T-Hs-HH T-LHs-HH, T-LHs-LH, T-LHs-HL, T-LLs-HH, T-LLs-LH and T-LLs-HL have a spatial resolution of one. The coefficients of the sub-bands T-Hs-LL, T-LHs-LL redecomposed subsequently, T-LLs-LL redecomposed subsequently, TLHs-LLHH, TLHs-LLLH, T-LHs-LLHL, T-LLsLLHH, T-LLs-LLLH and T-LLs-LLHL have a spatial resolution of one half. The coefficients of the sub-bands T-LHs-LLLL and T-LLs-LLLL have a spatial resolution of one quarter. The determination of the effective spatial resolution for each coefficient of a decomposition sub-band is explained in more detail with reference to FIG. 6.

Figure 6:
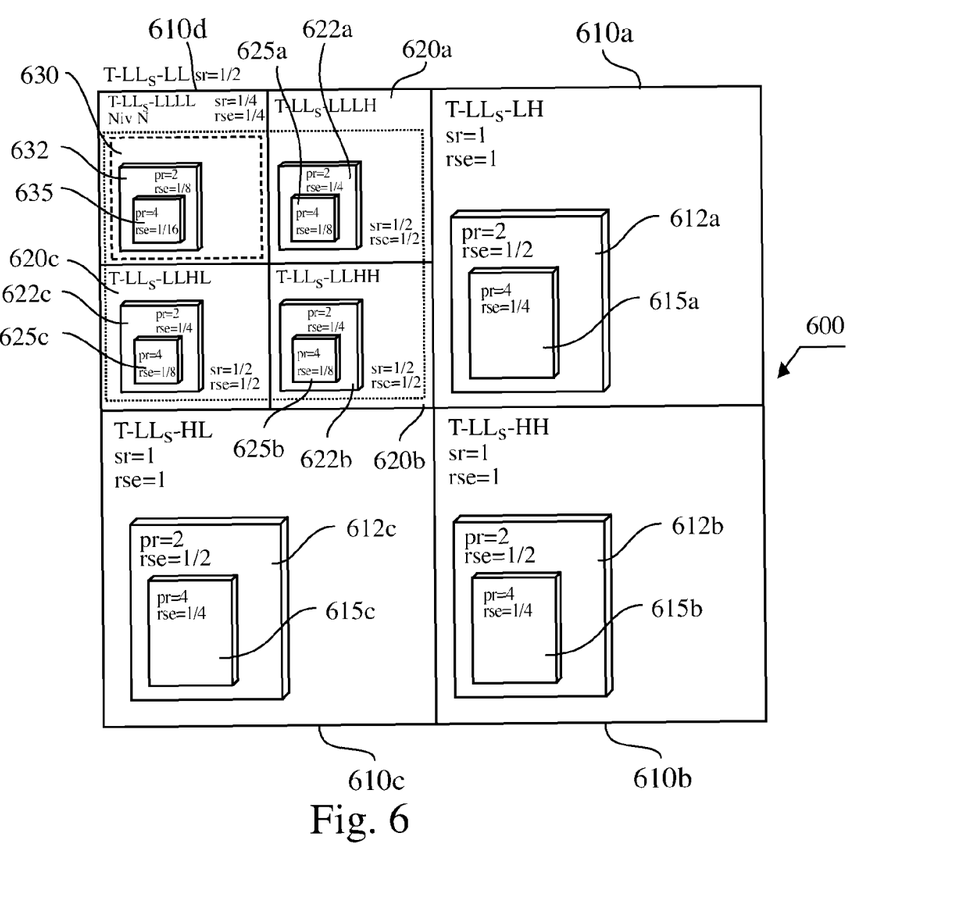
FIG. 6 is a representation of a temporal sub-band decomposed into spatial sub-bands and in which various effective spatial resolutions are determined according to a preferred embodiment of the invention.

FIG. 6 is a representation of a temporal sub-band decomposed into spatial sub-bands and in which different effective spatial resolutions are determined according to the invention.

The temporal sub-band 600 in FIG. 6 is for example the temporal sub-band T-LL in FIG. 4. The temporal sub-band 600 is decomposed into a sub-band T-LLs-LH 610a of spatial resolution 1, a sub-band T-LLs-HH 610b of spatial resolution 1, a sub-band T-LLs-HL 610c of spatial resolution 1 and a sub-band T-LLs-LL 610d of spatial resolution one half. The sub-band T-LLs-LL 610d is decomposed into a sub-band T-LLs-LLLH 620a of spatial resolution one half, a sub-band T-LLs-LLHH 620b of spatial resolution one half, a sub-band T-LLs-LLHL 620c of spatial resolution one half and a sub-band T-LLs-LLLL 630 of spatial resolution one quarter.

The zones 612, 622 and 632 of the temporal sub-band 600 correspond to a zone of a corresponding image of the temporal sub-band 600 for which the pseudo-resolution determination module 12 has determined a pseudo-resolution of two. The zones 615, 625 and 635 of the temporal sub-band 600 correspond to zone of a corresponding image of the temporal sub-band 600 for which the pseudo-resolution determination module 12 has determined a pseudo-resolution of four.

The effective spatial resolution of the coefficients included in the zones 612a, 612b and 612c is equal to one half, the effective spatial resolution of the coefficients included in the zones 615a, 615b and 615c is equal to one quarter, the effective spatial resolution of the coefficients included in the zones 622a, 622b and 622c is equal to one quarter, the effective spatial resolution of the coefficients included in the zones 625a, 625b and 625c is equal to one eighth, the effective spatial resolution of the coefficients included in the zone 632 is equal to one eighth and the effective spatial resolution of the coefficients included in the zone 635 is equal to one sixteenth.

The coefficients comprised in the sub-bands 610a, 610b, 610c with the exception of the coefficients included in the zones 612 and 615 have an effective spatial resolution of one, corresponding to their spatial resolution.

The coefficients included in the sub-bands 620a, 620b, 620c, with the exception of the coefficients in the zones 622 and 655, have an effective spatial resolution of one half corresponding to their spatial resolution.

The coefficients included in the sub-band 630, with the exception of the coefficients included in the zones 632 and 635, have an effective spatial resolution of one quarter, corresponding to their spatial resolution.

The video coder with motion compensated temporal filtering and discrete wavelet decomposition 10 also comprises a decision module 17, the decision module 17, from the effective spatial resolution calculated for each coefficient and the target restitution resolution for which the scalable data stream 18 is formed by the progressive stream generation module 19, determines which high-frequency coefficients must be inserted in the scalable data stream 18 for the restitution level or resolution level currently being processed.

Conventionally, according to the example in FIG. 4, the scalable data stream 18 consists of three resolution levels. The first resolution level, denoted Niv N, comprises the low-frequency sub-bands T-LLs-LLLL, T-LHs-LLLL, T-Hs-LLLL and T-H's-LLLL. This restitution level corresponds to the lowest restitution resolution of the video image sequence 18, in this case the restitution resolution one quarter. The second restitution level denoted Niv N−1 comprises the high-frequency sub-bands T-Hs-LLHL, T-Hs-LLLH, T-Hs-LLHH, T-H'sLLHL, T-H'sLLLH, T-H's-LLHH and the high-frequency sub-bands T-LHs-LLLH, T-LHs-LLHL T-LHs-LLHH, TLLs-LLLH, T-LLs-LLHL and T-LLs-LLHH. This restitution level corresponds to an intermediate resolution of the video image sequence 18, in this case the resolution one half. The third restitution level, denoted Niv N−2, comprises all the other sub-bands in FIG. 4 indexed by the reference Niv N−2. This restitution level corresponds to a maximum resolution of the video image sequence 18, in this case the resolution 1.

According to the invention, the decision module 17 inserts, in a restitution level, the high-frequency coefficients of other high-frequency sub-bands than those conventionally included in the spatial resolution level of the restitution level. For this, the decision module 17 compares, for each coefficient of each sub-band, the effective spatial resolution of the coefficient with the spatial resolution of the restitution level. If the effective spatial resolution of the coefficient is greater than the spatial resolution of the restitution level, the coefficient is not included in the restitution level. If on the other hand the effective spatial resolution of the coefficient is less than or equal to the spatial resolution of the restitution level, the coefficient is included in the restitution level if it has not been previously included in a restitution level.

Thus, according to the example in FIG. 6, when the restitution level is the level N, that is to say of resolution one quarter, the coefficients included in the zones denoted 622a, 622b, 622c, 625a, 625b, 625c, 615a, 615b and 615c are inserted in the scalable data stream 18 at this restitution level in addition to the coefficients of the frequency sub-band denoted Niv N in FIG. 4.

When the restitution level is the level N−1, that is to say of resolution one half, the coefficients included in the zones denoted 612a, 612b, 612c are inserted in the scalable data stream at this restitution level in addition to the coefficients of the frequency sub-bands denoted Niv N−1 in FIG. 4. It should be noted here that that the coefficients included in the zones denoted 615a, 615b and 615c are not inserted at this restitution level since they were inserted at a previous restitution level.

The decision module 17 transfers the various decomposition sub-bands necessary for the formation of a required restitution level and the coefficients determined as having to be included in the required restitution level at the progressive stream generation module 19.

The progressive stream generation module 19 forms a scalable data stream 18 from the data received from the decision module 17 and motion fields transferred by the estimation module 11.

In a variant embodiment, the progressive stream generation module 19 inserts in the scalable data stream the effective spatial resolution of each coefficient determined as having to be included in a restitution level.

The progressive stream generation module 19 encodes the scalable data stream 18 using a rate-distortion optimisation algorithm such as the one used in the coder as described in the document "High Performance Scalability Image Compression with EBCOT", IEEE Transactions on Image Processing, Vol 9, No 7, July 2000, by David Taubman.

Conventionally, such a coder modifies the quantisation of a group of coefficients to as to minimise the rate under constraint of a maximum distortion. This optimisation is rendered by the Lagrange formula:

$$\min_{\{\theta_s\}} R(\{\theta_s\}) + \lambda D(\{\theta_s\})$$

in which R is the rate, D represents the distortion and $\theta_s$ a set of coding parameters for a frequency sub-band.

According to a particular aspect of the present invention, during the rate-distortion optimisation, the pseudo-resolution of each coefficient is taken into account. The progressive stream generation module 19 encodes the scalable data stream 18 by performing an optimisation such as:

$$\min_{\{\theta_s\}} R(\{\theta_s\}) + f(c)\lambda D(\{\theta_s\})$$

in which f(c) is a weighting factor for weighting the distortion of the coefficient c. The higher the weighting vector f(c), the more the distortion will be attenuated on the coefficient.

Preferably, $f(c)=(pr(c))^2$ if the effective spatial resolution of the coefficient is less than or equal to the spatial resolution of the restitution level.

In a variant embodiment, the selection and coding of the coefficients are combined by posing f(c)=0 if the effective spatial resolution of the coefficient is higher than the spatial resolution of the restitution level.

Figure 2:
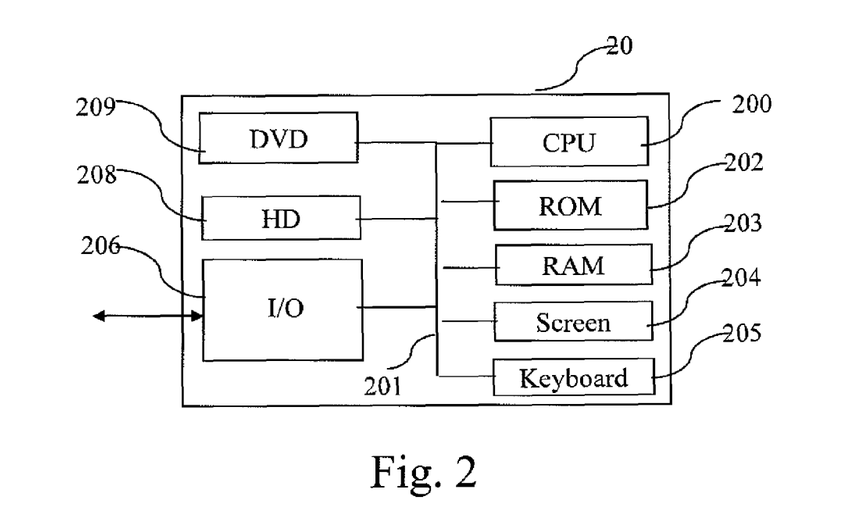
FIG. 2 is a block diagram of a computing and/or telecommunication device able to execute the coding and decoding algorithms in accordance with the algorithms described with reference to FIGS. 3 and 8.

FIG. 2 depicts a block diagram of a computing and/or telecommunication device able to execute the coding and decoding algorithms in accordance with the algorithms described with reference to FIGS. 3 and 8.

This computing and/or telecommunication device 20 is adapted to perform, using software, a motion compensated temporal filtering on an image sequence in order to form temporal sub-bands and to perform a spatial decomposition of the temporal sub-bands in order to form high- and low-frequency sub-bands comprising coefficients. The device is able to form a scalable data stream in which high-frequency coefficients of spatial sub-bands are inserted in at least one restitution level with a resolution different from that of the frequency sub-bands conventionally included in the restitution level.

The device 20 also is able to perform, using software, a inverse motion compensated temporal filtering on a scalable data stream and to process high-frequency coefficients included in the restitution level, the resolutions of which are different from those of the frequency sub-bands included in the restitution level for forming a video image sequence. The device 20 is also able to determine the spatial resolution of each coefficient included in the scalable data stream 18.

The device 20 is in a variant able to detect, for certain high-frequency coefficients, in the scalable data stream 18, information representing an effective spatial resolution of coefficients, in order to form a video image sequence 15 from temporal sub-bands, spatial sub-bands and coefficients whose effective spatial resolution is included in the scalable data stream 18.

The device 20 is for example a microcomputer. It may also be integrated in a video image sequence display means such as a television or any other device for generating a set of information intended for reception terminals such as televisions, mobile telephones, etc.

The device 20 comprises a communication bus 201 to which there are connected a central unit 200, a read only memory 202, a random access memory 203, a screen 204, a keyboard 205, a hard disk 208, a digital video disc player/recorder or DVD 209, and an interface 206 for communication with a telecommunication network.

The hard disk 208 stores the program implementing the invention, as well as the data for the coding and/or or decoding according to the invention.

In more general terms, the programs according to the present invention are stored in a storage means. This storage means can be read by a computer or microprocessor 200. This storage means is integrated or not in the device, and may be removable.

When the device 20 is powered up, the programs according to the present invention are transferred into the random access memory 203, which then contains the executable code of the invention as well as the data necessary for implementing the invention.

The device 20 is able to read a video image sequence received by the communication interface 206 and to code it in the form of a scalable data stream in accordance with the present invention.

The device 20 is able to read a scalable data stream received by the communication interface 206 or read from a DVD disc by means of the DVD player 209 and to decode it in the form of a video image sequence in accordance with the present invention.

Figure 3:
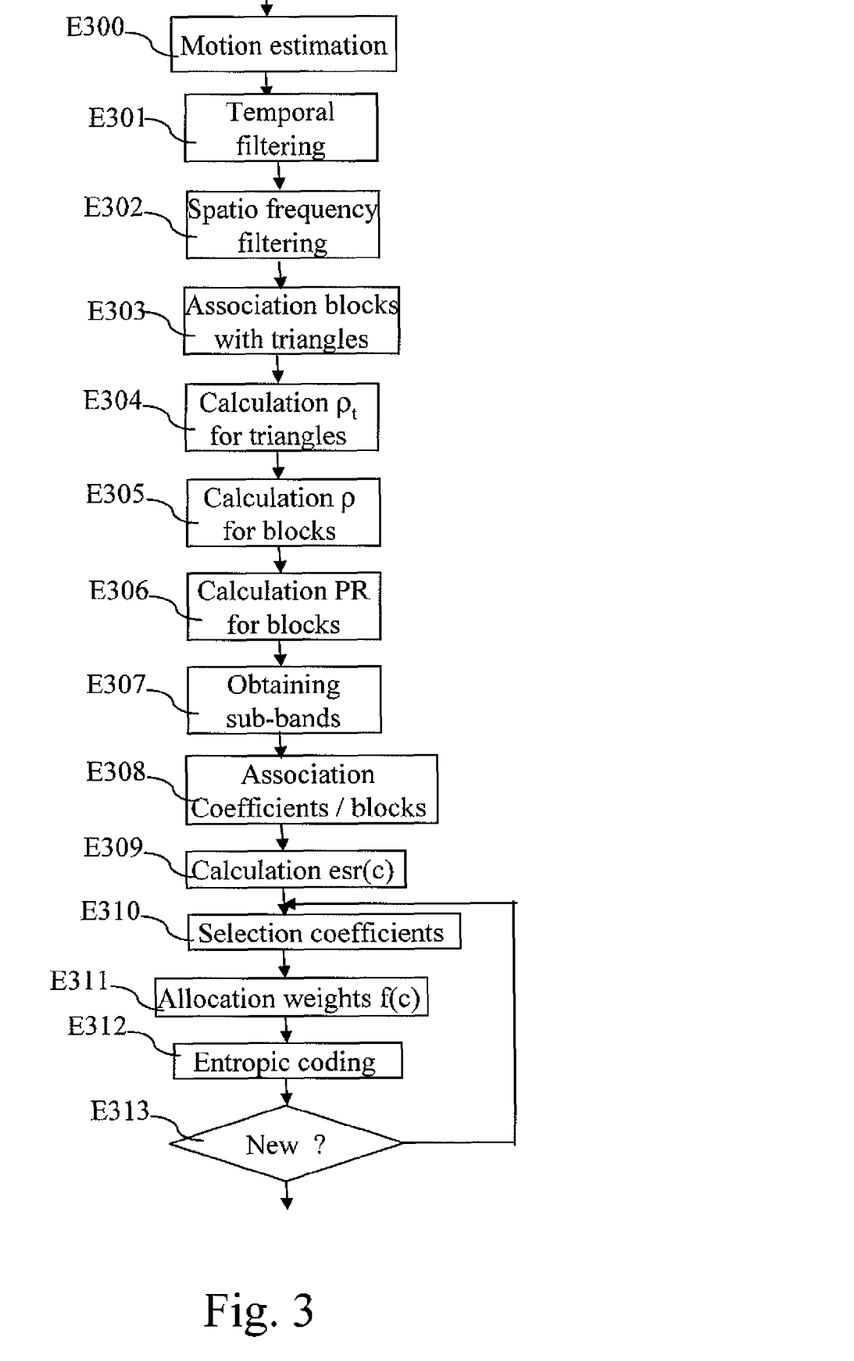
FIG. 3 is the algorithm for adapted selection of coefficients obtained by discrete wavelet decomposition according to a preferred embodiment of the invention.

FIG. 3 depicts the algorithm for the adapted selection of coefficients obtained by discrete wavelet decomposition according to the invention.

The processor 200 of the coding and/or decoding device 20 performs a temporal filtering and a decomposition into frequency sub-bands according to the technique known by the term "lifting".

At step E300 the processor 200 of the device 20 calculates, for each image in the video image sequence, an estimation of motion between an image and its adjacent images. This motion estimation is for example a motion estimation by matching blocks of an image to each of the adjacent images. The processor makes a motion estimation in the same way as that performed by the estimation module 11 of the decoder described in FIG. 1.

At the following step E301, the processor 200 performs a motion compensated temporal filtering. The processor 200 executes a discrete wavelet decomposition between the images in the image sequence in order to decompose the video image sequence into several temporal sub-bands, distributed over one or more resolution levels. The processor 200 performs the motion compensated temporal filtering in the same way as that performed by the motion compensated temporal filtering module 13 in FIG. 1.

At the following step E302, the processor 200 performs a spatial decomposition of the temporal sub-bands obtained at step E301 in order to form low-frequency and high-frequency sub-bands. The spatial decomposition is performed in the same way as that performed by the discrete wavelet decomposition module 14 in FIG. 1.

At the following step E303, the processor 200 associates each block defined by the motion prediction module with four triangles in the same way as that performed by the pseudo-resolution calculation module 12 of the coder 10 in FIG. 1.

At the following step E304 the processor 200 determines an expansion factor $\rho_t$ for each triangle in the same way as that carried out by the pseudo-resolution calculation module 12 of the coder 20 in FIG. 1.

At the following step E305, the processor 200 determines the expansion factor $\rho$ of the block currently being processed from expansion factors of the triangles associated with the block in the same way as that performed by the pseudo-resolution calculation module 12 of the coder 10 in FIG. 1.

At the following step E306 the processor 200 calculates the pseudo-resolution denoted PR of each block of the image currently being processed from the expansion factors $\rho$ determined at step E305. The calculation of the pseudo-resolution denoted PR is done in the same way as that done by the pseudo-resolution calculation module 12 in FIG. 1.

The processor 200 performs the steps E303 to E306 for each block of the image currently being processed, for each temporal decomposition level and for each temporal image.

At the following step E307, the processor 200 reads the high-frequency sub-bands decomposed at step E302 and, at step E308, associates with each coefficient c of each of high-frequency spatial sub-band the pseudo-resolution pr(c) of the block corresponding spatially to the spatial coordinates of the coefficient.

At the following step E309 the processor 200 calculates, for each coefficient of each high-frequency sub-band, the effective spatial resolution denoted esr(c) of each coefficient c by dividing the spatial resolution of the coefficient by the pseudo-resolution of the coefficient.

At the following step E310 the processor 200 determines, amongst the high-frequency sub-band coefficients, the coefficients of the high-frequency sub-bands that must be inserted the scalable data stream. The processor 200 inserts in a restitution level, the high-frequency coefficients of other high-frequency sub-bands than those conventionally included in the restitution level in the same way as that carried out by the decision module 17 in FIG. 1.

At the following step E311, the processor 200 allocates a weighting factor f(c) to each coefficient c. This weighting factor f(c) makes it possible to weight the distortion of each coefficient c. The weighting factor f(c) is identical to that described with reference to FIG. 1. It will not be described further.

At step E312, the processor 200 carries out the entropic coding of the current restitution level in order to form a scalable data stream 18 from the coefficients of the various frequency sub-bands corresponding to the restitution level desired, the coefficients determined at step E310 and the motion fields estimated at step E300.

At step E313, the processor 200 checks whether or not another restitution level of the scalable data stream 18 must be coded. In the affirmative, the processor 200 reiterates the loop formed by steps E310 to E313 as long as all the resolution levels have not been processed. In the negative, the processor 200 stops the present algorithm.

Figure 7:
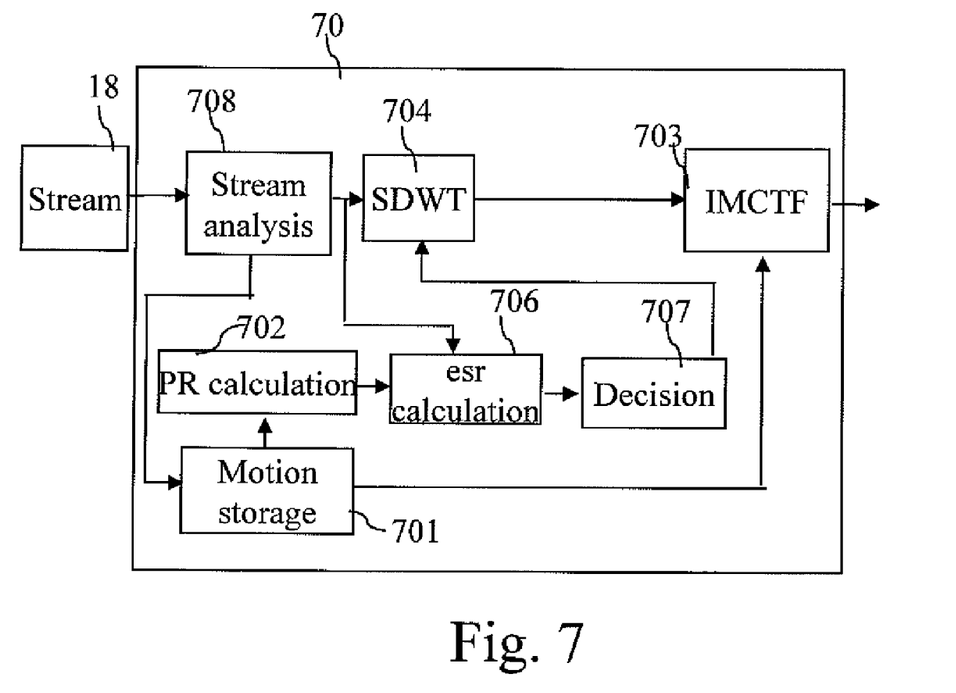
FIG. 7 is a block diagram of a video decoder with motion compensated temporal filtering and discrete wavelet decomposition according to a preferred embodiment of the invention.

FIG. 7 depicts a block diagram of a video decoder with motion compensated temporal filtering and discrete wavelet decomposition according to the invention.

The video decoder with motion compensated temporal filtering and discrete wavelet decomposition 70 is able to read a scalable data stream 18 and to decode this in the form of a video image sequence 15 in accordance with the present invention.

The video decoder with motion compensated temporal filtering and discrete wavelet compensation 70 or decoder 70 comprises a stream analysis module 708. The stream analysis module 708 performs an entropic decoding of the scalable data stream 18 and extracts from the scalable data stream thus decoded the various motion fields included in the scalable data stream 18 in order to transfer them to the pseudo-resolution calculation module 702 and to the motion field storage module 701. The stream analysis module 708 extracts from the decoded scalable data stream the coefficients of the various frequency sub-bands included in the scalable data stream and the coefficients that were inserted by the coder at the current restitution level in accordance with the present invention. The stream analysis module 708 transfers the extracted coefficients to the synthesis module 704. It should be noted here that, in a variant embodiment, the stream analysis module 708 also extracts the effective spatial resolutions associated with each coefficient and inserted by the coder 10 at the current restitution level in accordance with the present invention and transfers them to the decision module 707.

The pseudo-resolution calculation module 702 associates, with each block of the image currently being processed, four triangles in the same way as that carried out by the pseudo-resolution calculation module 12 in FIG. 1. From the motion field composed for each block of an image of a motion vector between the image currently being processed and its preceding adjacent image and a motion vector between the image and its following adjacent image the pseudo-resolution calculation module 12 is able to determine the position of the vertices of the triangles in the current image and in the adjacent images and, in the same way as the pseudo-resolution module 12 of the coder 10, calculates the expansion factor $\rho_t$ of each triangle. The pseudo-resolution calculation module 702 calculates the expansion factor $\rho$ for each block in the same way as the pseudo-resolution module 12 of the coder 10.

The pseudo-resolution calculation module 702 determines from the expansion factor $\rho$ of a block the pseudo-resolution PR of the block in the same way as the pseudo-resolution module 12 of the coder 10.

The decoder 70 also comprises an effective spatial resolution calculation module 706. The effective spatial resolution calculation module 706 determines, for each coefficient c of each high-frequency spatial sub-band received from the stream analysis module 708, an effective spatial resolution denoted esr(c). The effective spatial resolution calculation module 706 associates, with each coefficient, the pseudo-resolution of the block corresponding spatially to the coordinates of the coefficient. The effective spatial resolution calculation is identical to the calculation made by the effective spatial resolution module 16 of the coder 10 in FIG. 1. The effective spatial resolutions of each coefficient are transferred by the effective spatial resolution calculation module 706 to the decision module 707.

The decoder 70 carries out the calculation of the expansion factor, the pseudo-resolution and the effective resolution for each block of the image currently being processed, for each temporal decomposition level and for each temporal image.

The decision module 707, from the effective spatial resolution calculated for each coefficient and the restitution resolution of the scalable data stream 18 currently being processed, determines which high-frequency coefficients must be synthesised by the discrete wavelet synthesis module 704. For this, the decision module 707 compares, for each coefficient of each sub-band, the effective spatial resolution of the coefficient with the spatial resolution of the restitution level currently being processed. If the effective spatial resolution of the coefficient is higher than the spatial resolution of the restitution level, the coefficient is not transferred to the discrete wavelet synthesis module 704. If on the other hand the effective spatial resolution of the coefficient is less than or equal to the spatial resolution of the restitution level, the coefficient is transferred to the discrete wavelet synthesis module 704.

Thus, according to the example in FIG. 6, when the restitution level is the level N, that is to say a resolution of one quarter, the coefficients included in the zones denoted 622a, 622b, 622c, 625a, 625b, 625c, 615a and 615c are transferred by the decision module 707 to the discrete wavelet synthesis module 704.

The discrete wavelet synthesis module 704 synthesises the various frequency sub-bands transmitted by the stream analysis module 708 and the coefficients transmitted by the decision 707.

According to the example in FIG. 6 and when the restitution level is the level N, the discrete wavelet synthesis module 704 synthesises the frequency sub-band T-LLs-LLLL received from the stream analysis module 708 with a high-frequency sub-band comprising the coefficients included in the zones 622a and 625a and other coefficients set to zero, a high-frequency sub-band comprising the coefficients included in the zone 622b and 625b and other coefficients set to zero and a high-frequency sub-band comprising the coefficients included in the zones 622c and 625c and other coefficients set to zero, in order to form a sub-band with a frequency equivalent to the sub-band 630. The discrete wavelet synthesis module 704 synthesises the sub-band previously formed with a high-frequency sub-band comprising the coefficients included in the zone 615a and other coefficients set to zero, a high-frequency sub-band comprising the coefficients included in the zone 613b and other coefficients set to zero and a high-frequency sub-band comprising the coefficients included in the zone 615c and other coefficients set to zero in order to form a superresolution temporal sub-band, that is to say a sub-band with a spatial resolution higher than the spatial resolution requested.

Preferentially, these superresolution temporal sub-bands are transferred to the motion compensated inverse temporal filtering module 703. The motion compensated inverse temporal filtering module 703 performs a temporal filtering according to the "lifting" technique so as to reconstruct the various images of the video image sequence coded by the coder of the present invention.

The motion compensated inverse temporal filtering module 703 forms a video image sequence from high-frequency temporal sub-bands, low-frequency temporal sub-bands and motion estimations stored in the storage module 701.

In a variant the superresolution temporal sub-bands are, prior to their transfer to the motion compensated inverse temporal filtering module 703, subsampled in the same way as those having the same spatial resolution as the spatial resolution requested. The spatial high frequencies inserted are then reintegrated in the images at the time of the upsampling carried out at the decoder.

The video image sequence thus formed is then transferred for display thereof.

It should be noted here that, in a variant embodiment, when the various effective spatial resolution values are transmitted in the scalable data stream, the decoder 70 may not have a pseudo-resolution calculation module 702 and effective spatial resolution calculation module 706.

Figure 8:
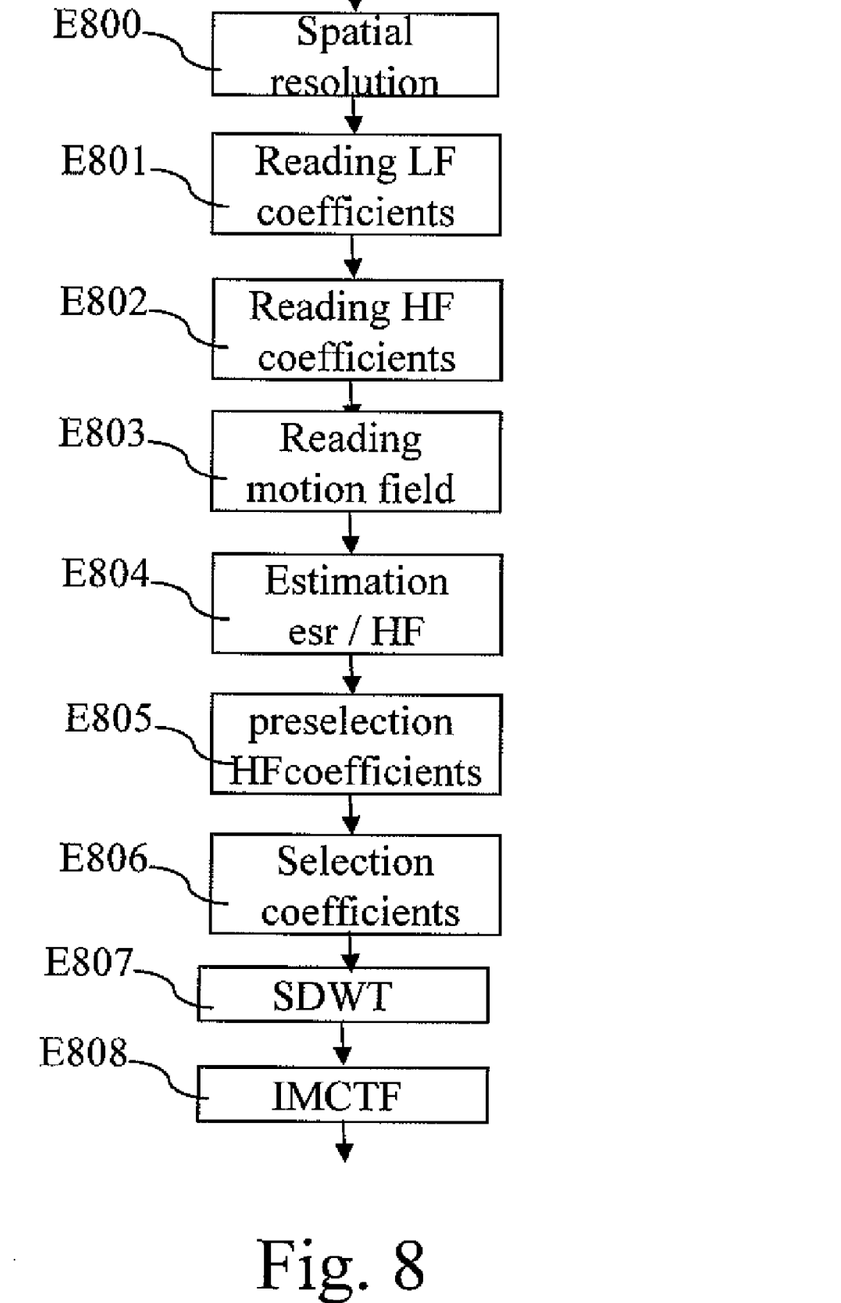
FIG. 8 is a diagram of the decoding algorithm of a stream of coded data according to a preferred embodiment of the invention.

FIG. 8 depicts the algorithm for decoding a stream of data coded according to the invention according to a first embodiment of the invention.

The processor 200 of the coding and/or decoding device 20 performs an inverse temporal filtering and a discrete wavelet synthesis according to the technique known by the term "lifting".

The processor 200 is able to read a scalable data stream 18 previously coded according to the invention and to decode this in the form of a video image sequence in accordance with the present invention.

At step E800, the processor 200 determines the spatial resolution of the restitution level and performs an entropic decoding of the scalable data stream 18.

At step E801, the processor 200 extracts from the scalable data stream thus decoded the coefficients of the various low-frequency sub-bands included in the scalable data stream.

At step E802, the processor 200 extracts, from the scalable data stream thus decoded, the coefficients of the various high-frequency sub-bands included in the scalable data stream and the coefficients that were inserted by the coder 10 at the current restitution level in accordance with the present invention.

At step E803, the processor 200 extracts from the scalable data stream thus decoded the various motion fields included in the data stream.

It should be noted here that, in a variant embodiment, the stream analysis module 708 also extracts the effective spatial resolutions associated with each coefficient inserted by the coder 10 at the current restitution level in accordance with the present invention.

At step E804, the processor 200 calculates, for each coefficient of the high-frequency sub-bands, the effective spatial resolution of the coefficient. The effective spatial resolution of the coefficient is calculated in the same way as that calculated by the pseudo-resolution calculation module 702 and the effective spatial resolution calculation module 706.

At step E805, the processor 200 effects a preselection of the high-frequency coefficients. This preselection consists of determining the high-frequency coefficients that must be synthesised by discrete wavelet synthesis. For this the processor 200 compares, for each coefficient of each sub-band, the effective spatial resolution of the coefficient with the spatial resolution of the restitution level currently being processed. If the effective spatial resolution of the coefficient is higher than the spatial resolution of the restitution level the coefficient is not adopted for being synthesised. If on the contrary the effective spatial resolution of the coefficient is less than or equal to the spatial resolution of the restitution level, the coefficient is preselected to be synthesised.

At step E806, the processor 200 selects, among the preselected coefficients, those which are to be synthesised. This selection is for example made according to the characteristics of the device 20.

At step E807, the processor 200 carries out a discrete wavelet synthesis and synthesises the various frequency sub-bands read at steps E801 and E802 as well as the coefficients selected at step E806. The discrete wavelet synthesis is identical to that described for the discrete wavelet synthesis module 704 of the decoder 70. At the end of the discrete wavelet synthesis, the superresolution temporal sub-bands are formed.

According to a preferred embodiment, at the following step E808, the processor 200 performs a motion compensated inverse temporal filtering. The processor 200 performs temporal filtering according to the "lifting" technique so as to reconstruct the different images of the video image sequence coded by the coder of the present invention. The processor 200 forms, from the superresolve high-frequency sub-bands, the low-frequency temporal sub-bands and the motion estimations read at step E803, a video image sequence.

In a variant, the superresolution temporal sub-bands are, prior to step E808, subsampled so that these have the same spatial resolution as the spatial resolution requested. The spatial high frequencies inserted are then reintegrated in the images at the time of the upsampling carried out at the decoder.

The video image sequence thus formed is then transferred for display thereof.

In a variant embodiment, the coder of the present invention does not process a video image sequence but processes a set of data representing the video image sequence. The set of data comprises the coefficients of the frequency sub-bands of different spatial resolutions. The coder determines, in the same way as that described previously, the effective spatial resolution of each coefficient included in the set of data. The coder forms a plurality of data streams. Each data stream consists of a restitution level comprising coefficients of frequency sub-bands whose spatial resolution is equal to a spatial resolution of the restitution level and coefficients of frequency sub-bands with a spatial resolution higher than the spatial resolution or resolutions of the restitution level.

The coder inserts, in at least one resolution level, the coefficients whose effective spatial resolution is lower than the spatial resolution of the resolution level.

Naturally the present invention is in no way limited to the embodiments described here but quite the contrary encompasses any variant within the capability of a person skilled in the art.

The invention claimed is:

1. A method of coding a video image sequence in coefficients of frequency sub-bands with different spatial resolutions, the method comprising:
    forming with a coding device at least one data stream having at least one restitution level comprising coefficients of frequency sub-bands having a spatial resolution equal to a spatial resolution of the restitution level,
    obtaining an effective spatial resolution for each of the frequency sub-band coefficients;
    comparing each effective spatial resolution with the spatial resolution or spatial resolutions of the at least one restitution level; and
    after the steps of obtaining and comparing, inserting with the coding device, in at least one of the restitution levels, coefficients of frequency sub-bands having a spatial resolution higher than the spatial resolution or spatial resolutions of the at least one restitution level, the frequency sub-band coefficients inserted in the restitution level being coefficients having an effective spatial resolution lower than the spatial resolution or spatial resolutions of the restitution level.

2. The method according to claim 1, wherein the step of obtaining the effective spatial resolution of coefficients comprises:
   determining a pseudo-resolution for each frequency sub-band coefficient, and
   dividing the spatial resolution of the sub-band to which a coefficient belongs by the pseudo-resolution of the coefficient.

3. The method according to claim 2, wherein the determination step, for each coefficient of the pseudo-resolution includes:
   estimating a motion field between each image and at least one image adjacent to the image in the video image sequence,
   determining, for each block of each image in the video image sequence, at least one expansion factor between the block of the image and the corresponding block in at least one adjacent image,
   setting the pseudo-resolution of a block to a value of one if the expansion factor of the block is equal to one,
   setting the pseudo-resolution of a block to the maximum value of the following values:
      (a) a value of one and (b) a value of the expansion factor between the block of the image and the corresponding block in at least one adjacent image.

4. The method according to claim 3, wherein the step of determining the expansion factor of a block includes:
   associating the block with a plurality of triangles,
   determining, for each triangle, an affine transformation between the vertices of the triangle in the block and the vertices of the corresponding triangle in the adjacent image from the motion field,
   determining, for each triangle, an expansion factor of the triangle by calculating a determinant of the affine transformation of the triangle,
   determining the expansion factor of the block from the expansion factors of the triangle associated with the block.

5. The method according to claim 1, wherein the coding of the video image sequence in coefficients of sub-bands with different spatial resolutions is performed by temporal filtering and discrete wavelet decomposition, the data stream being scalable data stream having a plurality of restitution levels.

6. The method according to claim 1, wherein:
   the video image sequence was previously coded in a set of data comprising the coefficients of the frequency sub-bands of different spatial resolutions,
   the method further includes forming a plurality of data streams having a restitution level and comprising coefficients of frequency sub-bands having a spatial resolution equal to a spatial resolution of the restitution level and coefficients of frequency sub-bands with a spatial resolution higher than the spatial resolution or spatial resolutions of the at least one restitution level.

7. The method according to claim 1, further comprising:
   inserting in the data stream the effective spatial resolution of each frequency sub-band coefficient inserted in a restitution level.

8. A method of decoding a data stream obtained by temporal filtering and discrete wavelet decomposition, the data stream including at least one restitution level, comprising coefficients of frequency sub-bands having a spatial resolution equal to a spatial resolution of the restitution level, the method comprises the steps of:
   obtaining with a decoding device, in at least one restitution level, coefficients of frequency sub-bands with a spatial resolution higher than the spatial resolution or spatial resolutions of the restitution level;
   obtaining an effective spatial resolution for each frequency sub-band coefficient;
   comparing each effective spatial resolution with the spatial resolution or spatial resolutions of the restitution level; and
   after the steps of obtaining and comparing, synthesizing with the decoding device the coefficients of frequency sub-bands having a spatial resolution equal to a spatial resolution of the restitution level and coefficients of frequency sub-bands with a spatial resolution higher than the spatial resolution or spatial resolutions of the restitution level, the frequency sub-band coefficients synthesized being coefficients having an effective spatial resolution less than the spatial resolution or spatial resolutions of the restitution level.

9. The method according to claim 8, wherein the effective spatial resolution of each frequency sub-band coefficient is obtained by reading each frequency sub-band coefficient in the data stream.

10. The method according to claim 8, wherein the step of obtaining the effective spatial resolution includes: determining a pseudo-resolution for each frequency sub-band coefficient, and dividing the spatial resolution of the sub-band to which a coefficient belongs by the pseudo-resolution of the coefficient.

11. The method according to claim 10, wherein the step of determining, for each coefficient, the pseudo-resolution includes:
   reading from the data stream a motion field between each image and at least one image adjacent to the image in the video image sequence,
   determining, for each block of each image in the video image sequence, at least one expansion factor between the block and the corresponding block in at least one adjacent image,
   setting the pseudo-resolution of a block to a value of one if the expansion factor of the block is equal to one, and
   setting the pseudo-resolution of a block to a maximum value of the following values: a value of one, the value of an expansion factor between the block of the image and the corresponding block in at least one adjacent image.

12. The method according to claim 11, wherein the step of determining the expansion factor of a block includes:
   associating the block with a plurality of triangles,
   determining, for each of the triangles, an affine transformation between vertices of the triangle in the block and vertices of a corresponding triangle in an adjacent image from the motion field,
   determining, for each triangle, an expansion factor of the triangle, by calculating a determinant of the affine transformation of the triangle, and
   determining an expansion factor of the block from the expansion factors of the triangles associated with the block.

13. A device for coding a video image sequence in coefficients of frequency sub-bands with different spatial resolutions, the coding device including:
  a processor arrangement arranged to be responsive to the video image sequence for:
    forming at least one data stream including at least one restitution level comprising coefficients of frequency sub-bands having spatial resolution equal to a spatial resolution of the restitution level;
    obtaining an effective spatial resolution for each of the frequency sub-band coefficients;
    comparing each effective spatial resolution with the spatial resolution or spatial resolutions of the at least one restitution level; and
    after the steps of obtaining and comparing, inserting in at least one restitution level coefficients of frequency sub-bands with a spatial resolution higher than the spatial resolution or spatial resolutions of the at least one restitution level, the frequency sub-band coefficients inserted in the restitution level being coefficients having an effective spatial resolution lower than the spatial resolution or spatial resolutions of the restitution level.

14. A device for decoding a data stream obtained by temporal filtering and discrete wavelet decomposition, the data stream including at least one restitution level comprising coefficients of frequency sub-bands having spatial resolution equal to a spatial resolution of the restitution level, the device including:
  a processor arrangement for:
    obtaining, in at least one restitution level, coefficients of frequency sub-bands having a spatial resolution higher than the spatial resolution or spatial resolutions of the restitution level;
    obtaining an effective spatial resolution for each frequency sub-band coefficient;
    comparing each effective spatial resolution with the spatial resolution or spatial resolutions of the restitution level; and
    after the steps of obtaining and comparing, synthesizing coefficients of frequency sub-bands having spatial resolution equal to a spatial resolution of the restitution level and coefficients of frequency sub-bands with a spatial resolution higher than the spatial resolution or spatial resolutions of the restitution level, the frequency sub-band coefficients synthesized being coefficients having an effective spatial resolution less than the spatial resolution or spatial resolutions of the restitution level.

15. A non-transitory storage medium or device storing a computer readable computer program including instructions for causing a computer arrangement to perform a method of coding a video image sequence in coefficients of frequency sub-bands with different spatial resolutions, the method comprising:
  forming at least one data stream having at least one restitution level comprising coefficients of frequency sub-bands having a spatial resolution equal to a spatial resolution of the restitution level;
  obtaining an effective spatial resolution for each of the frequency sub-band coefficients;
  comparing each effective spatial resolution with the spatial resolution or spatial resolutions of the at least one restitution level; and
  after the steps of obtaining and comparing, inserting, in at least one of the restitution levels, coefficients of frequency sub-bands having a spatial resolution higher than the spatial resolution or spatial resolutions of the at least one restitution level, the frequency sub-band coefficients inserted in the restitution level being coefficients having an effective spatial resolution lower than the spatial resolution or spatial resolutions of the restitution level.

16. A non-transitory computer readable storage medium or device storing a computer program including instructions for causing a computer arrangement to perform a method of decoding a data stream obtained by temporal filtering and discrete wavelet decomposition, the data stream including at least one restitution level, comprising coefficients of frequency sub-bands having a spatial resolution equal to a spatial resolution of the restitution level, the method comprising:
  obtaining, in at least one restitution level, coefficients of frequency sub-bands with a spatial resolution higher than the spatial resolution or spatial resolutions of the restitution level, and;
  obtaining an effective spatial resolution for each frequency sub-band coefficient;
  comparing each effective spatial resolution with the spatial resolution or spatial resolutions of the restitution level; and
  after the steps of obtaining and comparing, synthesizing the coefficients of frequency sub-bands having a spatial resolution equal to a spatial resolution of the restitution level and coefficients of frequency sub-bands with a spatial resolution higher than the spatial resolution or spatial resolutions of the restitution level, the frequency sub-band coefficients synthesized being coefficients having an effective spatial resolution less than the spatial resolution or spatial resolutions of the restitution level.

17. A method comprising:
  generating a signal by:
    forming with a coding device at least one data stream having at least one restitution level comprising coefficients of frequency sub-bands having a spatial resolution equal to a spatial resolution of the restitution level;
    obtaining an effective spatial resolution for each of the frequency sub-band coefficients;
    comparing each effective spatial resolution with the spatial resolution or spatial resolutions of the at least one restitution level; and
    after the steps of obtaining and comparing, inserting with the coding device, in at least one of the restitution levels, coefficients of frequency sub-bands having a spatial resolution higher than the spatial resolution or spatial resolutions of the at least one restitution level, the frequency sub-band coefficients inserted in the restitution level being coefficients having an effective spatial resolution lower than the spatial resolution or spatial resolutions of the restitution level; and
  transmitting the signal from a device.

18. A method comprising:
  generating a signal by:
    forming with a coding device at least one data stream having at least one restitution level comprising coefficients of frequency sub-bands having a spatial resolution equal to a spatial resolution of the restitution level;
    obtaining an effective spatial resolution for each of the frequency sub-band coefficients;
    comparing each effective spatial resolution with the spatial resolution or spatial resolutions of the at least one restitution level; and after the steps of obtaining and comparing, inserting with the coding device, in at least one of the restitution levels, coefficients of frequency sub-bands having a spatial resolution higher than the spatial resolution or spatial resolutions of the at least one restitution level, the frequency sub-band coefficients inserted in the restitution level being coefficients having an effective spatial resolution lower than the spatial resolution or spatial resolutions of the restitution level; and storing the signal on a non-transitory computer readable medium.

* * * * *